United States Patent [19]

Ohtsuka et al.

[11] Patent Number: 5,352,747
[45] Date of Patent: Oct. 4, 1994

[54] LIGHT-DIFFUSING POLYCARBONATE RESIN COMPOSITIONS CONTAINING POLYMETHYL SILSESQUIOXANE

[75] Inventors: Yoshio Ohtsuka, Haga; Tomohide Fujiguchi, Utsunomiya; Katsumi Oishi, Shimodate, all of Japan

[73] Assignee: GE Plastics, Japan, Ltd., Tokyo, Japan

[21] Appl. No.: 163,220

[22] Filed: Dec. 7, 1993

[30] Foreign Application Priority Data

Dec. 24, 1992 [JP] Japan .................................. 4-357435

[51] Int. Cl.⁵ .................... C08F 283/02; C08G 77/06
[52] U.S. Cl. ...................................... 525/464; 528/10; 528/12; 528/198; 40/541; 359/615
[58] Field of Search ................ 528/10, 12, 198; 359/615; 40/541; 525/464

[56] References Cited

U.S. PATENT DOCUMENTS

| | | | |
|---|---|---|---|
| 4,207,357 | 6/1980 | Goossens | 427/162 |
| 4,491,508 | 1/1985 | Olson et al. | 204/159.13 |
| 4,617,057 | 10/1986 | Plueddemann | 106/2 |
| 4,889,901 | 12/1989 | Shama et al. | 526/279 |
| 5,037,878 | 8/1991 | Cerles et al. | 524/588 |

*Primary Examiner*—John Kight, III
*Assistant Examiner*—Terressa Mosley

[57] ABSTRACT

To obtain light-diffusing polycarbonate resin compositions which show excellent light diffusing characteristics while maintaining the impact strength and other inherent properties of the matrix resin.

Resin compositions in which certain light-diffusing fine particles are added and dispersed in 100 wt. parts polycarbonate resins.

2 Claims, No Drawings

LIGHT-DIFFUSING POLYCARBONATE RESIN COMPOSITIONS CONTAINING POLYMETHYL SILSESQUIOXANE

The present invention relates to light-diffusing polycarbonate resin compositions suitable for use as translucent, light-diffusing components of lighting fixtures, ornaments, signs, etc.

Polycarbonate resins have excellent properties such as impact resistance, heat resistance, and weather resistance, and so are used in a wide range of applications as high-performance plastics with high light transmission.

There has also been a demand for semitransparent materials for products such as lighting fixture covers, displays, and translucent screens. Examples of suitable materials for these applications include transparent plastics mixed or coated with fine particles of transparent inorganic materials such as barium sulfate, calcium carbonate, or quartz (Japanese Early Patent Disclosure Publication No. 54-155241, Japanese Patent Publication No. 46-43189).

However, with such light-diffusing materials, unless the concentration of fine particles exceeds a certain level, their light-diffusing performance will be inadequate, so that the shape of the light source shows through them. On the other hand, if the concentration of fine particles is excessive, the amount of light transmitted by the material decreases, resulting in lower efficiency.

It has been disclosed (in Japanese Early Patent Disclosure Publication No. 60-139758) that one can obtain light-diffusing plastics which show good light diffusion and do not reveal the shape of the light source by dispersing in a transparent plastic transparent fine particles of restricted particle size and refractive index. The transparent fine particles used in this technology include crystalline silica, amorphous silica, glass, lithium fluoride, calcium fluoride, aluminum hydroxide, crystalline quartz, amorphous quartz, etc.

When polycarbonate (hereinafter abbreviated "PC") resins are used as the matrix resins in light-diffusing plastics formed by this technology, they show a marked lowering of their molecular weight, resulting in impaired impact strength and other physical and mechanical properties.

The object of the present invention is to provide translucent polycarbonate resin compositions which can show excellent light-diffusing characteristics while retaining the outstanding impact strength and other properties of the polycarbonate matrix resin.

The present invention is thus characterized by light-diffusing polycarbonate resin compositions in which 0.001~10.00 wt. parts poly(methyl silsesquioxanes) are added to and dispersed in 100 wt. parts polycarbonate resins.

The polycarbonates used as the matrix resin in this constitution can be aromatic polycarbonates made by the known phosgene or melt processes. (See for example, Japanese Early Patent Disclosure Publication No. 63-215763 or Japanese Early Patent Disclosure Publication No. 124934). Such polycarbonates consist of a carbonate component and a phenol component.

The precursor substance used to introduce the carbonate component may be phosgene, diphenyl carbonate, etc. Examples of suitable diphenols include 2,2-bis(4-hydroxyphenyl)propane (known as bisphenol A); 2,2-bis-(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl)decane; 1,4-bis(4-hydroxyphenyl)propane; 1,1-hydroxyphenyl)cyclododecane; 1,1-bis(3,5-dimethyl-4-hydroxyphenyl)cyclododecane; 4,4-dihydroxydiphenyl ether; 4,4-thiodiphenol; 4,4-dihydroxy-3,3-dichlorodiphenyl ether; and 4,4-dihydroxy-2,5-dihydroxyphenyl ether. These compounds may be used singly or in combinations. It is also possible to use, in addition to these, compounds having three or more phenolic hydroxy groups.

The poly(methyl silsesquioxane) dispersed in the polycarbonate causes light rays passing through to be diffused throughout the plastic. When incorporated into the composition, this powder has lower specific gravity than pulverized quartz, diatomaceous earth, or other siliceous fillers of similar particle size, and causes less of an increase in the viscosity of the composition than fumed silica or precipitated silica. It also has much less of a problem of settling out on prolonged storage than other powders. Consequently, large amounts of it can be used to fill the composition.

Poly(methyl silsesquioxanes) obtained by hydrolytic condensation in aqueous ammonia or amines of methyltrialkoxysilanes, or their hydroxyzates or condensates, are preferred because they are practically free of impurities such as chlorine, alkali metals, or alkaline-earth metals, and consist of particles which are spherical in shape and form free-flowing powders.

The average poly(methyl silsesquioxane) particle size should be in the range of 0.1~10 $\mu$m, preferably 1.0~5.0 $\mu$m. Particles less than 0.1 $\mu$m in size are difficult to produce, and particles larger than 10 $\mu$m will not disperse evenly in the resin for good product uniformity.

The amount added should be 0.001 to 10 wt. parts per 100 wt. parts of the polycarbonate matrix resin. If less than 0.001 wt part is added, it will be difficult to obtain good product uniformity, whereas if more than 10 wt. parts is added the light transmission of the product will be too low, making it impossible to accomplish the object of the invention.

Light-diffusing polycarbonate resins in accordance with the present invention may be prepared by mixing the polycarbonate matrix resin with poly(methyl silsesquioxanes) meeting the specifications described above, then melt kneading the mixture in a suitable extruder and extruding it to form pellets. In order to improve the weather resistance or UV resistance of the composition, other additives such as stabilizers, antioxidants, mold release agents, crystal nucleating agents, plasticizers, flow promoters, antistatic agents, flame retardants, or colorants may also be added in the manufacturing process.

The poly(methyl silsesquioxane) particles used in light-diffusing polycarbonate resin compositions in accordance with the present invention undergo only very slight deformation during processing of the resin, and retain their spherical shape. Consequently, when incident light beams strike the particles dispersed in the proper range of concentrations, they are reflected in various directions. This causes the phenomenon of diffusion.

In addition, because each of the fine polymer particles is itself transparent, an incident light beam which passes through them is refracted in various directions.

The combination of reflected and refracted beams results in excellent light diffusion.

The present invention will now be illustrated by the following examples.

EXAMPLES 1~3

One hundred weight parts of a polycarbonate resin (made by Nihon G. E. Plastics, with IV=0.5 dL/g) was combined in a Henschel mixer with 0.2, 1.0, or 2.0 wt. parts of a poly(methyl silsesquioxane): $(CH_3SiO_{1.5})_n$ (trade-named Tospearl, made by Toshiba Silicone) having average particle size 2 μm, then melt blended in a 65-mm uniaxial extruder to form pellets.

The pellets thus obtained were fed to a 150-t injection-molding machine to form 1-mm, 2-mm, and 3-mm specimens, a total of 9 specimens of the different compositions, which were then tested to measure their physical and optical properties. The molding conditions for ordinary specimens were at 280° C. with a 30-second cycle, while those for the hold-up molding test specimens were 300° C. with a 600-second cycle. The properties and optical characteristics of the specimens thus obtained are listed in Table 1.

The Izod (impact strength) was measured according to the ASTM D 256 standard notched Izod impact test, using molded specimens measuring 63.5×12. 7×3.2 mm, at room temperature.

The T.S. (tensile strength) was measured according to the ASTM D-638 standard method using molded No. 1 dumbbell specimens 175 mm long and 3.18 mm thick. The MI (flow characteristic) was measured according to the JIS K7210 A method, at 300° C. with a 1.2 kg load (condition 21). The MI after holdup was measured under the same conditions.

The haze, expressed as a percentage, was obtained by subtracting the dispersed light intensity from the incident light intensity, measured using a MDH-1001DH haze meter from Nippon Denshoku Kogyo. The light transmission, expressed as a percentage, was obtained by subtracting the total light transmission from the incident beam intensity, measured using an integrating spherical light transmittance meter.

COMPARISON

The procedure of the examples was repeated, except that 2.0 wt. parts of the conventional additive calcium carbonate ($CaCO_3$) was added instead of the poly(methyl silsesquioxane). The resulting composition was molded into test specimens and tested as in the examples.

As can be seen from Table 1, the small amount of additive used in Example 1 was sufficient to give a composition whose light-diffusing characteristics surpassed those obtained in the Comparison, while its other properties remained comparable or even improved. This effect was also seen in Example 2. In Example 3 there was less of an effect in terms of optical characteristics, but the other properties were excellent, so in certain applications it may be appropriate to use an amount of additive in this range.

TABLE 1

Examples 1~3 and Comparison

| | | | Ex. 1 | Ex. 2 | Ex. 3 | Comp. |
|---|---|---|---|---|---|---|
| Polycarbonate Resin (wt. parts) | | | 100 | 100 | 100 | 100 |
| Poly(methyl silsesquioxane) (Tospearl 120) | | | 0.2 | 1.0 | 2.0 | — |
| Calcium Carbonate ($CaCO_3$) | | | — | — | — | 2.0 |
| Properties | | | | | | |
| Izod (Impact Strength) | kg·cm/cm² | | 89.0 | 88.0 | 88.0 | 80.0 |
| T.S. (Tensile Strength) | kg/cm² | | 630.0 | 630.0 | 630.0 | 630.0 |
| MI (Flow) | g/10 min | | 11.0 | 11.5 | 11.5 | 12.1 |
| Flow After Holdup | g/10 min | | 12.0 | 12.5 | 12.5 | 13.5 |
| Optical Characteristics | | | | | | |
| 1 mm | Light Transmission | T % | 75.9 | 60.0 | 51.5 | 70.5 |
| | Haze | % | 92.4 | 95.0 | 95.8 | 80.2 |
| 2 mm | Light Transmission | T % | 65.7 | 50.5 | 43.9 | 76.5 |
| | Haze | % | 95.6 | 96.0 | 96.0 | 91.0 |
| 3 mm | Light Transmission | T % | 57.4 | 45.0 | 38.4 | 75.2 |
| | Haze | % | 96.1 | 96.0 | 96.0 | 93.8 |

Light-diffusing polycarbonate resins in accordance with the present invention have good light dispersion despite their high rate of light transmission. As a result, they are penetrated readily by light beams even though the shape of the light source is not visible. In addition, they show no lowering of the inherent impact resistance of the PC matrix resin. They can therefore be used to advantage in applications requiring high light transmission and high integrity for safety, such as skylights, walls, and other large-scale lighting covers, as well as signs. Because they maintain the inherent properties of PC resins, their weather resistance, chemical resistance, and flame retardance are also excellent, making them promising candidates for use in a wide range of applications.

We claim:

1. A light-diffusing polycarbonate resin composition comprising from about 0.001 to about 10.00 wt. parts polymethyl silsesquioxane dispersed in 100 wt. parts polycarbonate resins.

2. The light-diffusing polycarbonate resin compositions of claim 1 wherein the average polymethyl silsesquioxane particle size is, from about 0.1 to about 10 μm.

* * * * *